United States Patent [19]

Faltermeier et al.

[11] Patent Number: 4,737,022
[45] Date of Patent: Apr. 12, 1988

[54] AUTOMATIC FOCUSING DEVICE FOR REFLECTED LIGHT MICROSCOPES

[75] Inventors: Bernd Faltermeier, Aalen; Reinhard Jorgens, Oberkochen, both of Fed. Rep. of Germany

[73] Assignee: Carl-Zeiss-Stiftung, Heidenheim on the Brenz, Fed. Rep. of Germany

[21] Appl. No.: 891,777

[22] Filed: Jul. 30, 1986

[30] Foreign Application Priority Data

Jul. 31, 1985 [DE] Fed. Rep. of Germany ....... 3527322

[51] Int. Cl.⁴ .............................................. G02B 21/06
[52] U.S. Cl. .................................... 350/525; 350/518; 350/526
[58] Field of Search ........................ 350/518, 520–521, 350/523–528

[56] References Cited

U.S. PATENT DOCUMENTS 2,103,230 12/1937 Benford et al. ..................... 350/525
4,127,318 11/1978 Determann et al. ................ 350/525

FOREIGN PATENT DOCUMENTS 118814 6/1985 Japan ................................... 350/527
2122045 1/1984 United Kingdom ................ 350/526

*Primary Examiner*—William H. Punter
*Attorney, Agent, or Firm*—Stonebraker, Shepard & Stephens

[57] ABSTRACT

An automatic focusing microscope switchable between light-field and dark-field positions, so designed that the automatic focusing is operative in the dark-field condition or mode as well as in the light-field condition. In a first embodiment, auxiliary illumination of special wavelength (infrared or ultraviolet) used for the automatic focusing is reflected into the illumination-light ray path or beam, and in the dark-field mode the central portion of this beam is intercepted by a filter member which is opaque in the visible spectral region but transmits in the spectral region of the auxiliary illumination used for the automatic focusing function.

3 Claims, 3 Drawing Sheets

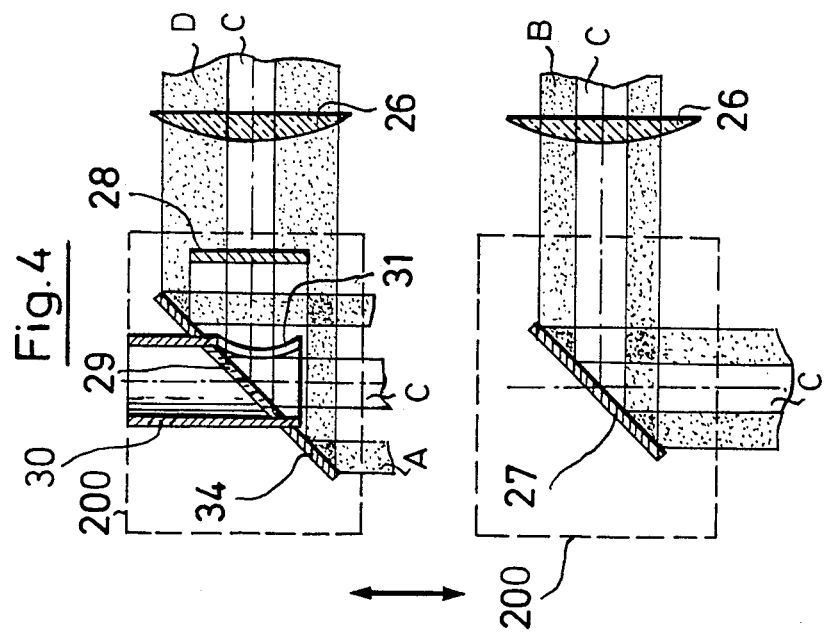
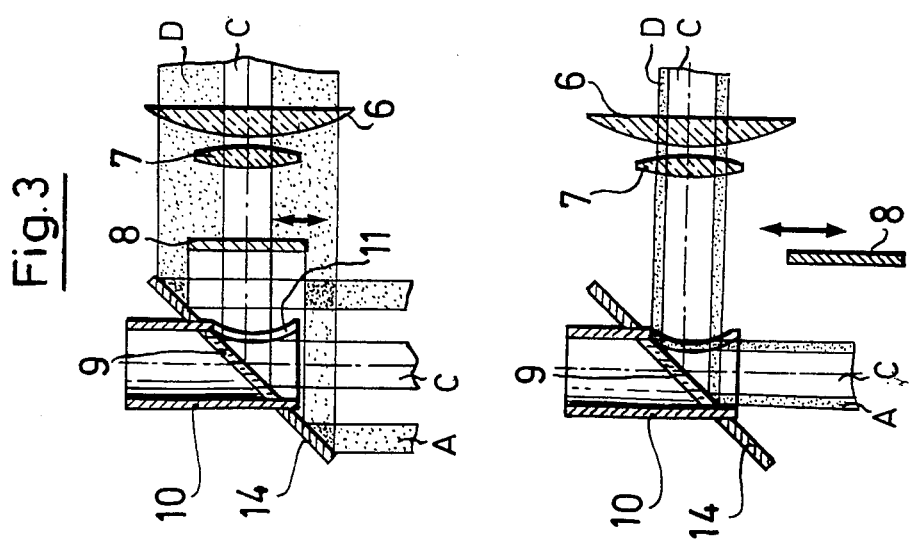

AUTOMATIC FOCUSING DEVICE FOR REFLECTED LIGHT MICROSCOPES

BACKGROUND OF THE INVENTION

This invention relates to an automatic focusing device for microscopes of the reflected light type, and particularly to microscopes which may be switched from bright field to dark field illumination and vice versa.

For certain uses, as for example for microscopic examination or verification of substrates or wafers in the electronics industry, there is a need for reflected-light microscopes which have automatic focusing capability, which relieves the user of the annoyance of having to refocus the focal plane on the surface of the object when scanning extensive regions of the specimen. For this purpose, automatic focusing systems have become popular, which provide an auxiliary illumination used for the automatic focusing control, this auxiliary illumination being in a special wavelength region such as the ultraviolet region, and being reflected into the ray path of the bright-field illumination of the microscope.

Such automatic focusing devices are known, for example, from Fed. Rep. of Germany Pat. No. 21 02 922 and its corresponding British Pat. No. 1,355,472, published June 5, 1974, and from Fed. Rep. Germany Offenlegungsschrift (published but unexamined application) No. 32 19 503 and its corresponding British patent application No. 2,122,045 A, published Jan. 4, 1984, and from Fed. Rep. Germany Offenlegungsschrift No. 34 46 727, published July 3, 1986.

However, until now the known automatic focusing devices have operated only with bright-field illumination. If a microscope equipped with the prior art focusing devices is switched to dark-field operation by inserting stops or changing the incident-light reflector, then the automatic focusing is no longer operative. The reason for this is that with incident-light dark-field illumination, the Kohler principle can not be maintained to the same extent as in the case of bright-field illumination, because in the case of dark-field illumination the light is conducted as an annular beam outside the objective and is focused on the object by an annular mirror placed around the object. In this case, if uniform dark-field illumination is desired for a number of objectives, the light stop is no longer focused precisely in the object plane as it is during bright-field operation. The fixed association of magnifiers and pupils with the object plane, indispensable for dependable automatic focusing, is lost.

Illuminating devices which can be switched between bright-field and dark-field illuminating modes are disclosed, for example, in Fed. Rep. German Offenlegungsschrift No. 23 31 750 and its corresponding U.S. Pat. No. 3,930,713, granted Jan. 6, 1976, and in Fed. Rep. Germany Offenlegungsschrift No. 25 42 075 and its corresponding U.S. Pat. No. 4,127,318, granted Nov. 28, 1978, and in Fed. Rep. Germany Gebrauchsmuster (Utility model) No. 79 17 232, published Sept. 20, 1979.

SUMMARY OF THE INVENTION

The object of the present invention is to provide a microscope switchable between bright-field and dark-field illumination conditions or modes, and so designed that automatic focusing operates dependably in both of these illumination modes.

This object is achieved by providing that a stop which cuts off the central part of the illuminating light beam in the dark-field mode is developed as a wavelength-selective filter which transmits in the wavelength region of the auxiliary illumination used for the automatic focusing function, and that an incident-light reflector is also provided in the dark-field mode, this reflector serving for mirroring or reflecting a central light beam into the viewing ray path.

This produces, in an extremely simple fashion, the result that the auxiliary illumination used for the automatic focusing, which is reflected into the microscope illumination, is brought to the objective in the dark-field switched position or mode as well as in the light-field position. The auxiliary illumination therefore remains unaffected by the switching process.

If the microscope which is to be equipped with the automatic focusing device already has a fixed incident-light reflector, and therefore a reflector which can be used for both the bright-field and dark-field switched positions, and if the switching to dark-field mode is effected solely by the insertion of stops, then it is merely necessary to replace the central stop by a filter which is adapted to (i.e., which passes) the wavelength region of the auxiliary illumination but which is opaque to wavelengths in the visible region.

If the switching to dark-field mode is effected by changing the incident-light reflector in the microscope which is to be provided with the automatic focusing device, then care must be taken that a reflector for the central region of the illuminating-light beam is provided also in the dark-field switched position. This reflector is then preferably developed as a dichromatic beam splitter which reflects in the wavelength region of the auxiliary illumination and transmits in the wavelength region of the dark-field illumination, so that no loss of light occurs either in the path of the viewing rays or in the path of the auxiliary illuminating rays used to control the automatic focusing function.

Other advantages of the invention will become apparent as the description proceeds.

BRIEF DESCRIPTION OF THE DRAWINGS

In the accompanying drawings, illustrating exemplary preferred embodiments of the invention.

FIG. 3 is a schematic view illustrating the effect of switching the construction shown in FIG. 1 from dark-field mode (upper part of FIG. 3) to bright-field mode (lower part of FIG. 3); and FIG. 4 is a similar schematic view showing the effect of switching the embodiment illustrated in FIG. 2 from dark-field mode (upper part of FIG. 4) to bright-field mode (lower part of FIG. 4).

DESCRIPTION OF THE PREFERRED EMBODIMENTS

Figure 1:
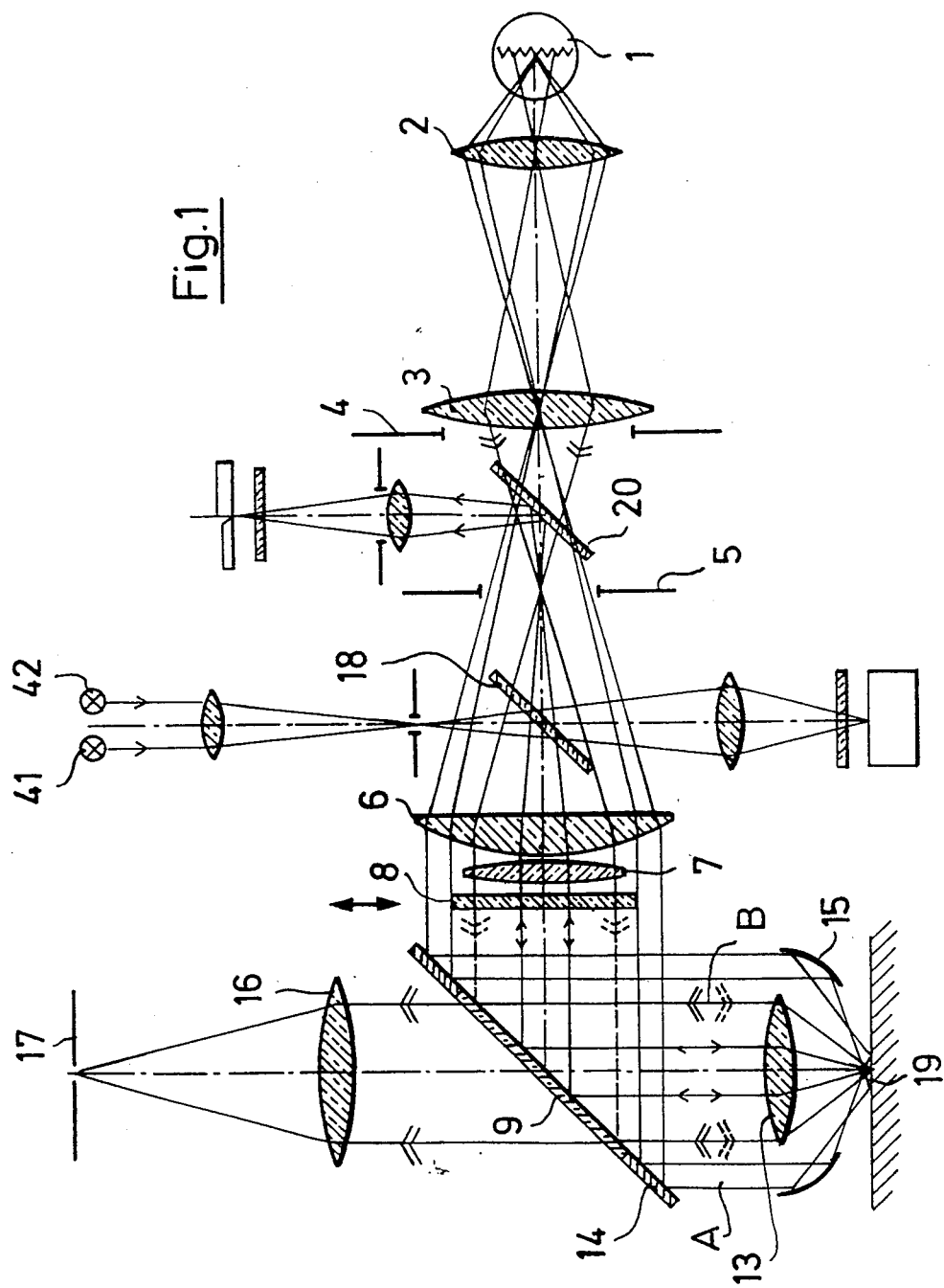
FIG. 1 is a basic schematic sectional view illustrating a microscope according to one embodiment of the invention with incident-light illuminating means for both bright-field and dark-field illumination, and additional auxiliary illumination means for an automatic focusing device.

Referring to FIG. 1, a first preferred embodiment of the invention comprises incident light illuminating means such as an incandescent bulb 1, a collector lens 2, an auxiliary lens 3 in the vicinity of an adjustable aperture stop 4, and a field stop 5. These are followed (in the direction of the light) by two lenses 6 and 7, which are located in front of the incident-light reflector 9, 14. This reflector is stationary, arranged at an angle as illustrated, and has an annular portion 14 which is fully reflecting so that it will reflect the annular illuminating-light beam A in a downward direction as illustrated, down onto the concave annular mirror 15 which reflects the illuminating beam onto the object or specimen 19 to be viewed. The central oval portion 9 of the inclined reflector, within the annular fully reflective portion 14, is a splitter mirror. The bright-field illumination light beam B of circular cross section is reflected thereby downwardly onto the microscope objective 13, and passes through the objective to the object or specimen 19.

The microscope includes the usual conventional parts for conveying an image of the object 19 to the eye of the observer. Most of these parts, being well known, are not shown here. There are shown, in FIG. 1, only a fragment of the ray path, and the already mentioned objective lens 13, and the tube lens 16 which projects an image of the object onto the intermediate image plane 17.

The two lenses 6 and 7, located in the path of the illumination beam from the light source, are of different diameters. In the bright-field ray path both lenses are active and they, in combination with the objective 13, serve to image the field stop 5 in the object 19. In the dark-field ray path only the larger diameter lens 6 is active and it, in combination with the concave annular mirror 15, images the aperture stop 4 approximately in the plane of the object 19.

The switching from bright-field to dark-field illumination is accomplished in known manner, by moving a central stop 8, in the vicinity of the reflector 9/14, into the ray path, and at the same time the field stop 5 is fully opened.

Between the aperture stop 4 and the field stop 5, and also between the field stop 5 and the lens 6, dichromatic splitting mirrors 20 and 18, respectively, are located. These mirrors are inclined to the optical axis of the incident-light illuminating beam, and serve for deflecting, out or in, of the auxiliary illumination which operates in the infrared portion of the spectrum and which controls the automatic focusing. This auxiliary illumination comes from two light-emitting diodes or laser diodes 41 and 42. Other elements of the auxiliary illuminating device and automatic focusing mechanism, and further information regarding the operation thereof, are given in the above mentioned published German Offenlegungsschrift No. 3,446,727.

In accordance with the invention, the central stop 8 is developed as a wavelength-selective filter which transmits practically fully in the spectral region of the auxiliary illumination (i.e., in the infrared) and is practically opaque in the visible spectral region. It may be noted from the upper part of FIG. 3 that when this central stop 8 is in its effective position (dark-field mode) the central part of the incident-light illuminating beam D coming from the bulb 1 is held back by this stop 8, and the annular dark-field beam A (the ring-shaped marginal part of the original beam which passes around the edges of the stop 8) is reflected by the annular fully reflecting portion 14 of the inclined reflector, downwardly toward the object 19.

The beam C of the auxiliary illumination, which is reflected by the mirror 18 into a path concentric with that of the illumination beam, is not blocked by the central stop 8 but passes through it and through a hole 11 in a cylinder 10 which serves to screen off stray light and which is coaxial with the optical axis of the objective 13. This beam C then impinges on the bright-field reflector 9 within the cylinder 10 and is thereby reflected downwardly to the objective 13, which then produces on the object 19 the infrared spot required for judging the position of the focus. The auxiliary illumination for the automatic focusing device is accordingly operated in the same manner as in the case of bright-field illumination, with simultaneous viewing of the object 19 in the dark field. The bright-field condition is seen in the lower part of FIG. 3, where the central stop 8 has been moved aside to an ineffective position.

Figure 2:
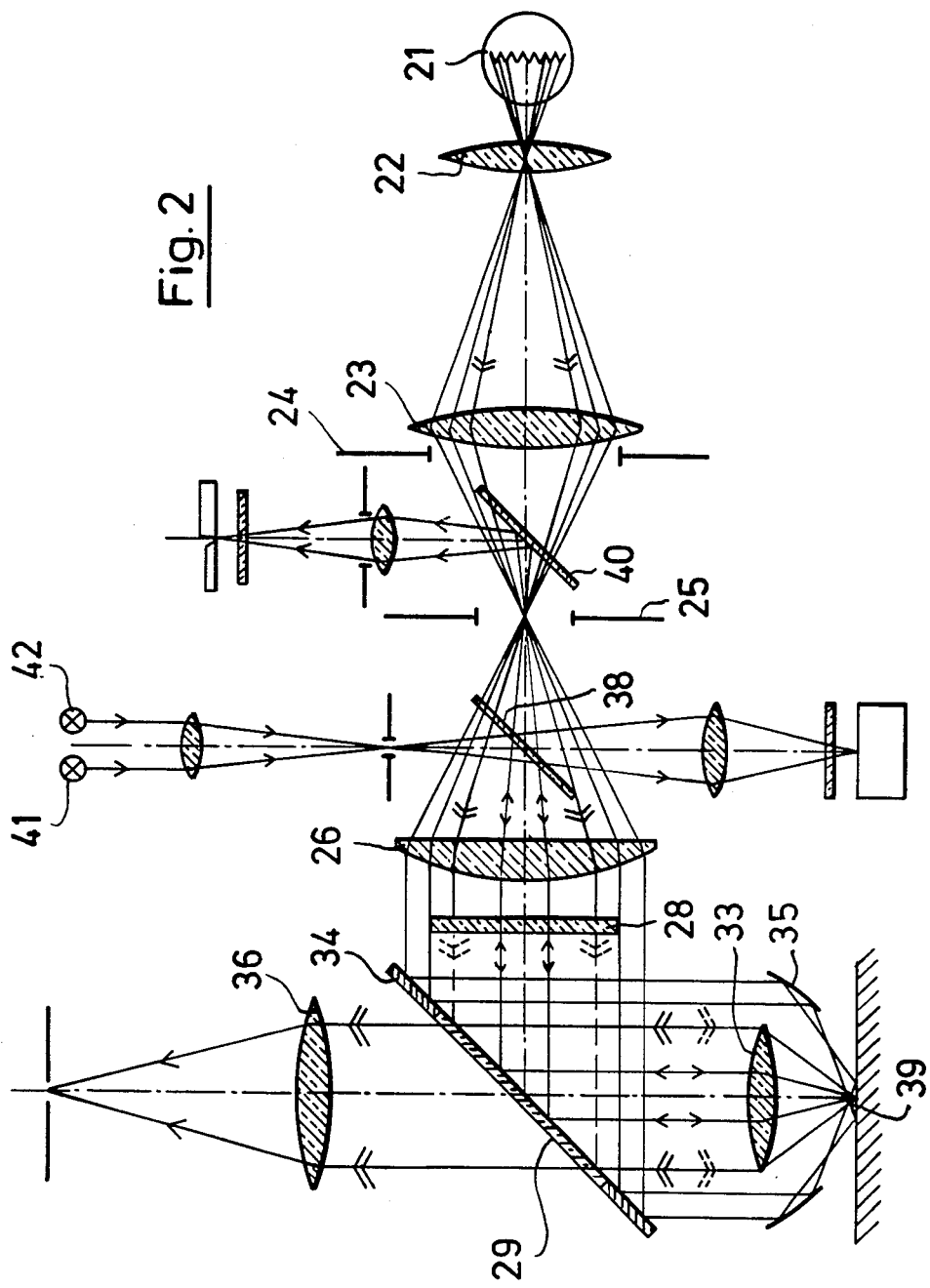
FIG. 2 is a similar view showing a second embodiment.

A second embodiment of the invention is illustrated in FIG. 2. Here, a light source 21 is imaged by a collector lens 22 into the aperture stop 24 and an adjacent auxiliary lens 23 which projects the collector into the field stop 25. However, instead of the lenses 6 and 7 which act differently in the bright-field ray path and the dark-field path in the embodiment according to FIG. 1, here in the second embodiment there is only a single lens 26, which acts uniformly for both the bright-field and dark-field ray paths. In the bright-field ray path, the field stop 25 is imaged by the objective 33 precisely into the object 39. In the dark-field ray path, the field stop 25 is imaged by the concave annular mirror 35 approximately into the object 39.

The splitting mirrors 38 and 40 in FIG. 2 have the same function as the mirrors 18 and 20, respectively, in FIG. 1; that is, they serve for the coaxial reflecting of the auxiliary illumination for the automatic focusing device, into the incident-light illumination ray path.

In the embodiment of FIG. 2, the entire incident-light reflector is displaceable for the purpose of switching between bright-field and dark-field illumination. There is a movable slide indicated schematically at 200 in FIG. 4, on which the reflecting means is mounted. In the bright-field position (lower portion of FIG. 4) the slide 200 carries into effective position only the bright-field reflector 27, which is a splitter mirror which is 50% reflecting and 50% transmitting within the visible spectral region.

When the slide 200 is moved to the dark-field position, it carries the mirror 27 out of effective position, and brings into effective position the parts shown within the outline 200 of the upper portion of FIG. 4. These parts include the annular mirror 34 with a central oval opening in which there is a cylindrical stray-light shield 30 (like the stray-light shield 10 of the first embodiment, FIGS. 1 and 3), provided like the cylinder 10 with a hole 31 which is concentric with the horizontal axis of the incident-light illuminating device. Within the oval opening of the dark-field reflector 34 there is mounted another reflector 29 which corresponds in function to the reflector 9 of FIG. 3 but has somewhat different reflection properties.

The reflector 29 is a dichromatic splitter and is practically completely transparent in the visible spectral region, while it is almost completely reflective in the infrared spectral region of the auxiliary illumination used for the automatic focusing. Furthermore, in front of the hole 31 in the stray-light shielding cylinder 30 there is a central stop 28 which, like the central stop 8 in FIGS. 1 and 3, is opaque in the visible spectral region and which transmits practically completely in the spectral region of the diodes 41 and 42 which produce the auxiliary illumination. This stop 28 may be, for instance, an interference filter, or a colored glass having long pass properties, such for example as filter glass LP 760.

After switching into the position shown in the upper part of FIG. 4 (the dark-field position), the central part of the incident-light illumination is cut out or blocked by the stop 28, resulting in the hollow or annular dark-field illumination beam A. The mirror 29 does not interfere with viewing of the object 39 since it is almost completely transparent to the viewing light in the visual spectral range, and thus practically no loss of light takes place in the viewing ray path.

On the other hand, the central infrared illumination beam C is not blocked by the central stop 28 but passes through this stop and is almost completely reflected by the mirror 29, downward toward the object 39. The measurement light sent back from the object also passes, again practically without reduction in intensity, via the mirror 29 and the filter or central stop 28, into the incident-light illuminating ray path. Accordingly, the signal derived therefrom for operating or controlling the refocusing mechanism, has at least the same, and actually even a higher, intensity in the dark-field switched position (upper part of FIG. 4) than in the bright-field switched position (lower part of FIG. 4), if it is assumed that the mirror 27 is a simple (50%) splitting mirror without chromatic effect.

In the first embodiment, illustrated in FIGS. 1 and 3, the incident-light illuminating ray path contains a lens 7 which, due to its smaller diameter, acts only on the bright-field illumination ray path and the auxiliary-illumination ray path, having no effect on the dark-field ray path. If this lens 7 is replaced, during the course of switching between bright-field and dark-field modes, by a lens of identical shape formed of the material of which the filter 8 is made, then a separate central stop can be eliminated. The stop is then a lens which is active solely for the auxiliary illumination beam.

It is furthermore possible to provide, for the embodiment with the dark-field ray path of FIG. 1, a switchable incident-light reflector similar to the one shown in FIG. 4, and to use a fixed incident-light reflector similar to that of FIG. 3 for the dark-field ray path of FIG. 2.

What is claimed is:

1. An automatic focusing device for a reflected-light microscope having an optical system which may be switched between bright-field illumination and dark-field illumination, said microscope and focusing device comprising means for producing an illuminating light ray and for directing said light ray along an illuminating ray path toward an object to be observed, means for producing a ray of auxiliary illumination within a special wavelength region and for reflecting said ray of auxiliary illumination into and along said illuminating ray path to form with said illuminating light ray a combined beam, a stop (8, 28) cutting off a central part of said beam in said illuminating ray path when said microscope is switched to dark-field illumination position, said stop being a wavelength-selective filter which transmits in the wavelength region of said auxiliary illumination, and an incident-light reflector (9, 29) switchable between bright-field position and dark-field position and effective in said dark-field position to reflect a central part of said beam into a viewing ray path, said reflector when switched to said dark-field position being a dichromatic splitter mirror which reflects in the wavelength region of said auxiliary illumination and transmits in the wavelength region of the visible dark-field illumination.

2. The invention defined in claim 1, wherein said incident light reflector (9, 29) in said dark-field position is associated with a cylindrical stray-light shield (10, 30) arranged coaxially to said viewing ray path, said shield having therein a hole (11, 31) aligned concentrically with said illumination ray path, said stop (8, 28) being located in front of said hole when said microscope is in said dark-field switched position.

3. The invention defined in claim 1, wherein said stop (8, 28) is in the form of a lens which is active for the auxiliary illumination ray path.

* * * * *